Patented Oct. 8, 1935

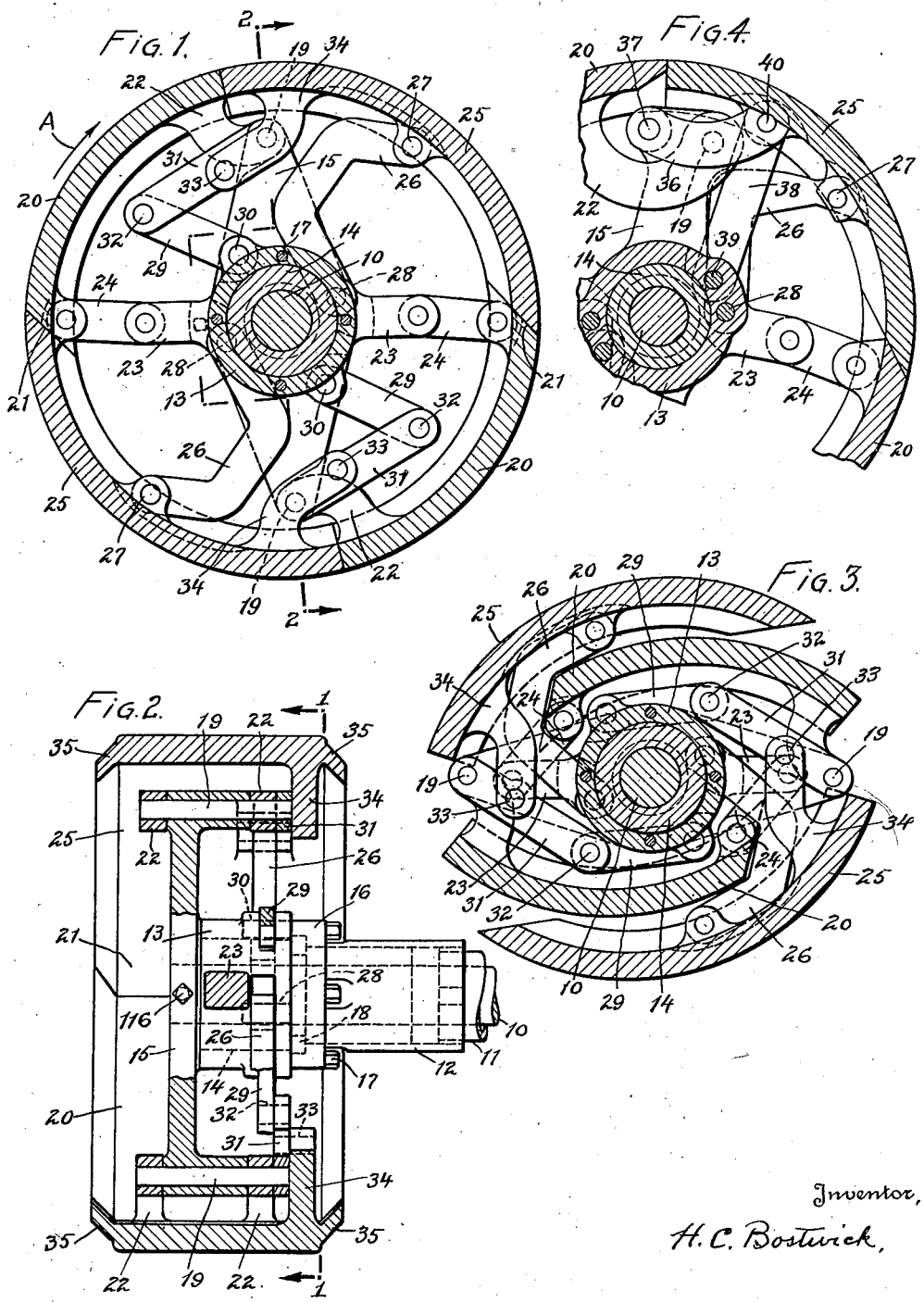

2,016,884

UNITED STATES PATENT OFFICE 2,016,884

COLLAPSIBLE TIRE BUILDING DRUM

Henry C. Bostwick, Coventry Township, Summit County, Ohio, assignor to The Akron Standard Mold Company, Akron, Ohio, a corporation of Ohio Application December 10, 1934, Serial No. 756,761

6 Claims. (Cl. 154—9)

This invention relates to pivoted-segment collapsible drums for building endless inextensible-edge bands such as those for forming pneumatic tire casings.

The segments of such drums commonly are four in number, comprising one pair of underlapping and one pair of overlapping segments pivotally mounted in couples at opposite ends of a supporting spider attached to the drum shaft, and collapsed or expanded by toggle means including a retardable member or sleeve surrounding the shaft. In one type of such drums the underlapping segments, which have more radial movement and are subjected to greater strains than the others, have been carried on floating pivots by the hinge members of the overlapping segments to increase the degree of contractibility of the drum for the removal of tire bands for large-section tires to go on small wheels.

One object of my invention is to attain the desired degree of contraction of the drum circumference by employing underlapping segments carried by pivots fixed on the spider and hence better able to withstand the strains, together with overlapping segments so mounted as to have a collapsing movement circumferentially of the underlapping ones as well as radially. A further object is to provide a novel linkage for the overlapping segments permitting the drum to be designed for a range of sizes by shifting the pivot centers and providing the appropriate linkage without having to design the drum throughout for each size. A still further object is to provide the necessary contracting movement for both pairs of segments in such a drum from the same control member or sleeve surrounding the shaft.

Of the accompanying drawing, Fig. 1 is a transverse section on the line 1—1 of Fig. 2 illustrating in the expanded condition a drum embodying my invention.

Fig. 2 is a longitudinal section on the line 2—2 of Fig. 1.

Fig. 3 is a transverse section showing the drum collapsed.

Fig. 4 is a partial view corresponding to Fig. 1 and showing a modification.

Referring at first to Figs. 1 to 3, 10 is the horizontal, rotary power shaft of a tire-building machine, surrounded by a sleeve or hollow shaft 11 which is rotatable with or in relation to the shaft 10 and is usually brake controlled for effecting the collapse and expansion of the drum through an extension sleeve 12 and a toggle member, sleeve or collar 13 rotatable on the hub 14 of a segment-supporting spider 15 which is detachably secured by a set screw 116 on the end of the shaft 10. The extension sleeve 12 has the usual spline connection with the hollow shaft 11 for longitudinal adjustment. The usual ring 10 or flange 16 on the extension sleeve, separably connected with the toggle sleeve 13 by screws 17 and engaging a split thrust ring 18 mounted in a groove of the spider hub, is provided for demounting the drum and the extension sleeve 12 from the shafts 10 and 11.

The respective oppositely-extending arms of the spider 15 are provided with fixed pivot pins 19 whereby the two members of a pair of key segments 20 whose free ends are in underlapping relation to those of the complemental segments at the beveled joints 21 are, through inwardly-projecting lugs 22, hinged to the spider. These underlapping or key segments are controlled in the usual manner by the toggle sleeve 13 through a pair of arms 23 on said sleeve, connected with the segments by toggle links 24 pivoted at their inner and outer ends respectively to the arms and to inwardly-projecting lugs or ears located near the free ends of the segments 20.

25 are the two members of the complemental pair of segments having their free ends in overlapping relation to the ends of the segments 20 and indirectly pivoted at their heel ends upon the arms of the spider 15. In the present invention, these overlapping segments are supported and conjointly operated by two sets of toggle linkage. One set is formed by the usual bent links 26 having their outer ends connected by pins 27 with inwardly-projecting lugs or ears in the middle region of the segments 25 and their inner ends connected by pins 28 with the control sleeve 13. In reaching the expanded condition, the pins 28 relatively pass over center or beyond a straight line connecting the centers of the shaft 10 and the pins 27 so that the segments 25 move outwardly a slight distance beyond the operating circle of the expanded drum and then inwardly to that circle and in line with the segments 20, thereby, in conjunction with the toggle members 23, 24, providing a relative timing of the underlapping and overlapping segments during collapse, which avoids interference between their ends and also utilizing the binding force of the tire material wrapped upon the drum to facilitate tire-building operations when the drum is being reversely rotated, opposite to the direction of the arrow A in Fig. 1, without any tendency of the drum to collapse by the inertia of its peripheral parts when the reverse rotation is started.

The second set of links for the overlapping segments is provided by respective pairs of toggle links, each consisting of a link member 29 having an inner pivot connection at 30 with ears on the control sleeve 13, and a second link member 31 whose free end is pivotally connected by a knuckle pin 32 with the outer end of the link member 29 and its other end carried by the spider 15 on the pin 19 which hinges the underlapping segment 20 of the couple 20, 25, together with a controllable pin 33 movably or shiftably carried by the link member 31 between the pins 19 and 32 and hingedly supporting the heel end of the segment 25 through an inwardly-projecting hinge lug 34. This latter arrangement permits the attainment of the necessary degree of collapse in drums of different sizes using some of the same parts, such as spider 15 and control sleeve 13, by providing substitute links 29 and 31 of different lengths and/or pin-center locations without requiring a special design throughout for each size.

The drum segments are provided with the usual bead-seating shoulders and depressed marginal flanges 35, the shape of which may be varied as desired, and for the sake of simplicity, the usual widthwise adjustment by means of screw-fastened wing members and gap shield is omitted from the illustration.

In collapsing this drum by its own momentum during forward rotation in the direction of the arrow A in Fig. 1, the control sleeve 13 is retarded and arrested in the usual manner by the application of a friction brake to the hollow shaft 11, and the continued forward rotation of the shaft 10 and spider 15 from the position shown in Fig. 1 to that shown in Fig. 3 while the control sleeve is arrested effects the collapse through the operation of the toggle linkage. The underlapping segments 20 first move inwardly and both ends of the overlapping segments 25 at first move slightly outward from the expanded drum circle, this initial outward movement being produced by the conjoint action of the outer pivots 27 of the bent links 26 in moving forward over the center line and a slight outward movement of the pins 32 and 33 as the links 29 approach a position at right angles to the links 31. The relaxing of the tire band between the two overlapping segments by the inward movement of the underlapping ones permits this initial outward movement of the overlapping segments without causing undue strain upon the tire fabric. Such outward movement is immediately followed by an inward radial movement of the overlapping segments and also a limited circumferential movement of the latter over the underlapping segments to the position represented in Fig. 3 as the simple toggles formed by the control sleeve 13 and the bent links 26 and the compound toggles formed by said sleeve and toggles 29, 31 are respectively folded and extended as will be apparent in Fig. 3, the extension or partial straightening of the toggles 29, 31 serving to carry the movable pins 33 radially inward to produce this circumferential movement of the overlapping segments.

In the modification represented in Fig. 4, the underlapping segments 20 are carried and operated as before and the overlapping segments at their middle region are operated substantially as before through the action of the toggle sleeve 13 and bent links 26, but said overlapping segments at their heel region are connected through simple links 36 with fixed hinge pins 37 on the spider 15 and are supported and operated from the sleeve 13 by auxiliary links 38 coupled with the sleeve by pins 39 circumferentially adjacent to the inner pins 28 of the bent links, and at their outer ends by the pins 40 which connect the links 36 with said overlapping segments. This form allows both sets of segments to be operated by the same control sleeve where an extreme pivotal movement of the underlapping segments is provided in attaining a high degree of contraction without producing an excessive initial outward movement of the overlapping segments at the beginning of the contracting movement, but it produces less circumferential movement of the overlapping segments upon the underlapping ones than the previously described form in reaching the collapsed position.

I claim:

1. A collapsible drum structure comprising a rotary power shaft, underlapping and overlapping drum segments supported thereby, a retardable member surrounding the shaft, operating connections from said member to the underlapping segments, and operating linkage connecting said member with the overlapping segments at circumferentially spaced points on each of the latter.

2. A collapsible drum structure comprising a rotary power shaft, a segment-supporting spider thereon, a pair of underlapping segments oppositely pivoted to said spider on fixed centers, a pair of overlapping segments, a retardable member surrounding the shaft and having operating connections to said underlapping segments, toggle links connecting said member with the overlapping segments at the middle region of the latter, and additional toggle linkage for the heel region of the overlapping segments including links and controllable segment pivots carried thereby.

3. A collapsible drum structure comprising respective pairs of underlapping and overlapping segments, and operating means for both sets of segments having connections with the overlapping segments for first moving them outwardly at both ends as the underlapping segments move inwardly at the beginning of the collapsing movement, and then swinging said overlapping segments inwardly over the underlapping ones.

4. A collapsible drum structure comprising a rotary power shaft having a segment support, a set of underlapping segments pivoted to said support on fixed centers, a set of overlapping segments carried by said support on movable pivots, a retardable member surrounding said shaft, and connections from said member to the several segments and to the pivots of the overlapping segments for first swinging the underlapping segments inwardly during collapse and then swinging inwardly the overlapping segments and bodily moving them circumferentially over the underlapping ones by a radial shifting of said movable pivots.

5. A collapsible drum structure comprising a rotary power shaft having a segment-supporting spider, a retardable control member surrounding said shaft, a pair of pivoted underlapping segments carried by the spider and controlled by said member, a pair of overlapping segments carried by the spider, and operating linkage connecting said overlapping segments with the control member, including a pair of bent links connected with their middle region and linkage connected with their heel region by radially movable segment pivots.

6. A drum structure according to claim 5 in which the heel connections of the overlapping segments include for each segment a pair of links forming a toggle, one member of which is pivoted to the control member and the other member to the spider, and a shiftable segment pivot on said other member.

HENRY C. BOSTWICK.